US010521570B2

(12) United States Patent
Nicholas, III et al.

(10) Patent No.: US 10,521,570 B2
(45) Date of Patent: *Dec. 31, 2019

(54) SYSTEM AND METHOD FOR CURSOR-BASED APPLICATION MANAGEMENT

(71) Applicant: James J. Nicholas, III, San Francisco, CA (US)

(72) Inventors: James J. Nicholas, III, San Francisco, CA (US); Dale L. Fuller, Menlo Park, CA (US)

(73) Assignee: James J. Nicholas, III, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,616

(22) Filed: Nov. 11, 2016

(65) Prior Publication Data

US 2017/0061107 A1  Mar. 2, 2017

Related U.S. Application Data

(60) Continuation of application No. 14/944,785, filed on Nov. 18, 2015, now Pat. No. 9,524,075, which is a continuation of application No. 14/688,659, filed on Apr. 16, 2015, now Pat. No. 9,235,329, which is a continuation of application No. 14/262,499, filed on (Continued)

(51) Int. Cl.
| | |
|---|---|
| *G06F 3/048* | (2013.01) |
| *G06F 21/31* | (2013.01) |
| *G06F 3/0481* | (2013.01) |
| *G06F 3/0482* | (2013.01) |

(Continued)

(52) U.S. Cl.
CPC ............ *G06F 21/31* (2013.01); *G06F 3/0481* (2013.01); *G06F 3/0482* (2013.01); *G06F 3/04812* (2013.01); *G06F 3/04817* (2013.01); *G06F 3/04842* (2013.01); *H04L 63/08* (2013.01)

(58) Field of Classification Search
CPC . G06F 3/00; G06F 3/038; G06F 3/048; G06F 3/0481; G06F 3/0482; G06F 3/04812; G06F 9/4443; G06F 15/16; G06F 17/30; H04L 9/00; H04L 29/06
See application file for complete search history.

(56) References Cited

U.S. PATENT DOCUMENTS

| | | | |
|---|---|---|---|
| 4,358,672 | A | 11/1982 | Hyatt et al. |
| 4,710,955 | A | 12/1987 | Kauffman |

(Continued)

OTHER PUBLICATIONS

Microsoft PowerPoint 2000, Copyright 1987-1999, 2 pages.
Microsoft Word 2000, Copyright 1983-1999, 6 pages.

*Primary Examiner* — Xiomara L Bautista
(74) *Attorney, Agent, or Firm* — Polsinelli LLP

(57) ABSTRACT

A system and method of managing applications and event notifications using a cursor-based GUI, wherein the cursor-based GUI is located adjacent to the cursor and provides a user with the ability manage and monitor a plurality of dynamically updated applications, commands and event notifications via a persistent and centralized interface. Since the cursor-based GUI is persistent in nature, the plurality of applications, commands and event notifications can be accessed regardless of the user's computer environment. The user can manage user authentication requirements and other configuration information for the cursor-based GUI.

1 Claim, 19 Drawing Sheets

Related U.S. Application Data

Apr. 25, 2014, now Pat. No. 9,077,705, which is a division of application No. 13/797,827, filed on Mar. 12, 2013, now Pat. No. 8,850,357, which is a continuation of application No. 12/551,716, filed on Sep. 1, 2009, now Pat. No. 8,418,079.

(51) Int. Cl.
*H04L 29/06* (2006.01)
*G06F 3/0484* (2013.01)

(56) References Cited

U.S. PATENT DOCUMENTS

| | | | |
|---|---|---|---|
| 4,905,280 A | 2/1990 | Wiedemer et al. | |
| 4,907,273 A | 3/1990 | Wiedemer et al. | |
| 5,029,034 A | 7/1991 | Weiley | |
| 5,319,455 A | 6/1994 | Hoarty et al. | |
| 5,422,993 A | 6/1995 | Fleming | |
| 5,546,521 A | 8/1996 | Martinez | |
| 5,561,444 A | 10/1996 | Johnston, Jr. et al. | |
| 5,572,643 A | 11/1996 | Judson | |
| 5,596,750 A | 1/1997 | Li et al. | |
| 5,671,354 A * | 9/1997 | Ito | H04L 29/06 726/3 |
| 5,673,401 A | 9/1997 | Volk et al. | |
| 5,687,331 A | 11/1997 | Volk et al. | |
| 5,724,521 A | 3/1998 | Dedrick | |
| 5,737,619 A | 4/1998 | Judson | |
| 5,752,239 A | 5/1998 | Coutts | |
| 5,774,172 A | 6/1998 | Kapell et al. | |
| 5,784,056 A | 7/1998 | Nielsen | |
| 5,801,698 A | 9/1998 | Lection et al. | |
| 5,805,815 A | 9/1998 | Hill | |
| 5,809,242 A | 9/1998 | Shaw et al. | |
| 5,819,038 A | 10/1998 | Carleton et al. | |
| 5,852,440 A | 12/1998 | Grossman et al. | |
| 5,886,697 A | 3/1999 | Naughton et al. | |
| 5,898,432 A | 4/1999 | Pinard | |
| 5,966,691 A | 10/1999 | Kibre et al. | |
| 5,995,102 A | 11/1999 | Rosen et al. | |
| 6,018,345 A | 1/2000 | Berstis | |
| 6,021,433 A | 2/2000 | Payne et al. | |
| 6,065,057 A | 5/2000 | Rosen et al. | |
| 6,069,633 A | 5/2000 | Apparao et al. | |
| 6,085,249 A * | 7/2000 | Wang | H04N 21/234363 709/203 |
| 6,118,449 A | 9/2000 | Rosen et al. | |
| 6,137,487 A | 10/2000 | Mantha | |
| 6,209,011 B1 | 3/2001 | Vong et al. | |
| 6,212,265 B1 | 4/2001 | Duphorne | |
| 6,246,411 B1 | 6/2001 | Strauss | |
| 6,359,557 B2 | 3/2002 | Bilder | |
| 6,362,840 B1 | 3/2002 | Burg et al. | |
| 6,425,006 B1 | 7/2002 | Chari et al. | |
| 6,434,530 B1 | 8/2002 | Sloane et al. | |
| 6,438,216 B1 | 8/2002 | Aktas | |
| 6,453,021 B1 | 9/2002 | Ripley et al. | |
| 7,421,472 B1 * | 9/2008 | Ross, Jr. | G06Q 10/10 709/206 |
| 7,636,852 B1 * | 12/2009 | Balasubramanian | G06F 21/41 713/182 |
| 7,925,306 B2 | 4/2011 | Carmody et al. | |
| 8,073,590 B1 * | 12/2011 | Zilka | H04M 1/6083 340/572.3 |
| 8,782,394 B2 * | 7/2014 | O'Neil | H04L 63/083 380/270 |
| 2002/0010781 A1 * | 1/2002 | Tuatini | H04L 29/06 709/227 |
| 2002/0059369 A1 | 5/2002 | Kern et al. | |
| 2002/0065919 A1 * | 5/2002 | Taylor | G06F 17/30575 709/226 |
| 2002/0095584 A1 * | 7/2002 | Royer | H04L 63/0428 713/183 |
| 2002/0156905 A1 | 10/2002 | Weissman | |
| 2002/0198840 A1 * | 12/2002 | Banka | G06Q 30/0601 705/50 |
| 2003/0084171 A1 * | 5/2003 | de Jong | G06F 21/33 709/229 |
| 2004/0088586 A1 * | 5/2004 | Wesinger, Jr. | B65B 11/004 726/12 |
| 2004/0142720 A1 | 7/2004 | Smethers | |
| 2004/0205176 A1 * | 10/2004 | Ting | H04L 67/306 709/223 |
| 2004/0215711 A1 * | 10/2004 | Martin, Jr. | H04L 29/06 709/203 |
| 2005/0144573 A1 | 6/2005 | Moody et al. | |
| 2005/0160371 A1 * | 7/2005 | Karson | G06F 9/4443 715/777 |
| 2006/0007129 A1 | 1/2006 | Pletikosa | |
| 2006/0179304 A1 * | 8/2006 | Han | G06Q 20/027 713/168 |
| 2007/0036346 A1 | 2/2007 | Kwon | |
| 2007/0174193 A1 * | 7/2007 | Quan | G06F 21/41 705/44 |
| 2009/0049183 A1 * | 2/2009 | Thompson | G06F 21/41 709/229 |
| 2009/0100321 A1 | 4/2009 | Singh et al. | |
| 2009/0172795 A1 * | 7/2009 | Ritari | H04L 63/0815 726/7 |
| 2009/0199094 A1 * | 8/2009 | Jurgens | G06Q 20/02 715/700 |
| 2009/0249355 A1 | 10/2009 | Kaarela et al. | |
| 2010/0138212 A1 | 6/2010 | Wang et al. | |
| 2010/0162108 A1 | 6/2010 | Stallings et al. | |
| 2010/0235754 A1 * | 9/2010 | Leitheiser | H04L 63/0815 715/742 |
| 2011/0029921 A1 | 2/2011 | Tereda et al. | |
| 2011/0041169 A1 * | 2/2011 | De Luca | G06F 3/04817 726/7 |
| 2011/0047606 A1 * | 2/2011 | Blomquist | G06F 21/41 726/7 |
| 2011/0315763 A1 * | 12/2011 | Hochmuth | G06F 15/16 235/380 |
| 2012/0059534 A1 * | 3/2012 | Zilka | H04M 1/6083 701/2 |
| 2016/0110719 A1 * | 4/2016 | Durney | G06Q 20/4014 705/44 |

* cited by examiner

Right-Click Menu
On Windows OS Desktop

Right-Click Menu
On Mac OS Desktop

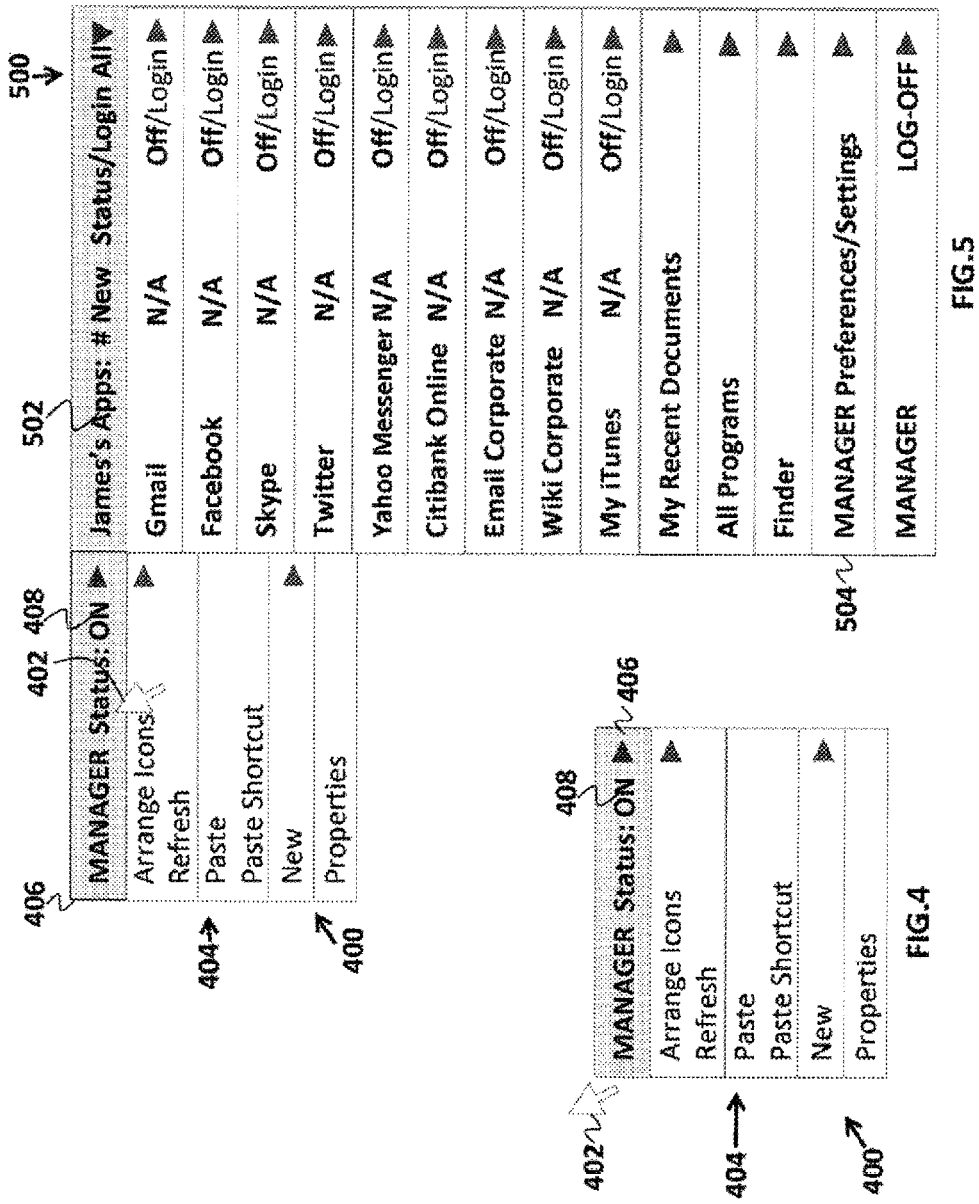

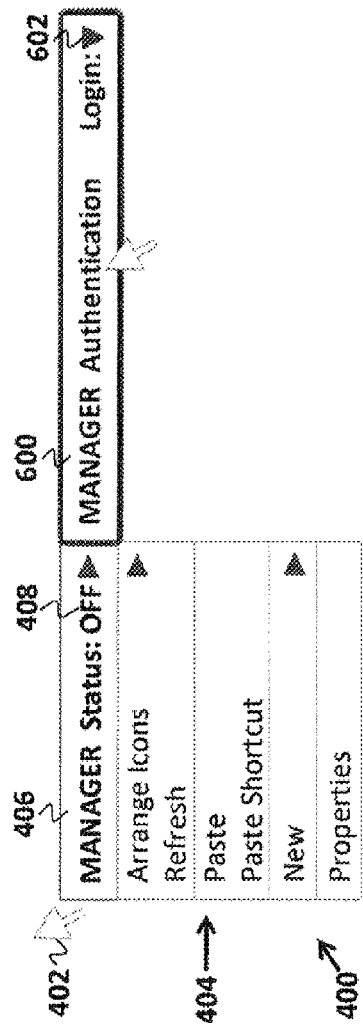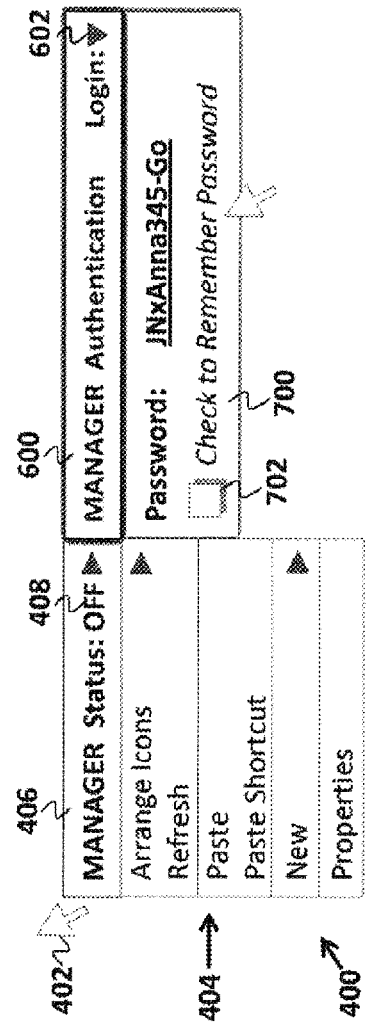

| MANAGER Status: ON ▲ |
|---|
| Arrange Icons |
| Refresh |
| Paste |
| Paste Shortcut |
| New |
| Properties |

406 → 404 → 400 → 408

| James's Apps: # New | Status/Login All ▼ |
|---|---|
| Gmail 14 | On/Logoff ▲ |
| Facebook 11 | On/Logoff ▲ |
| Skype 0 | On/Logoff ▲ |
| Twitter 22 | On/Logoff ▲ |
| Yahoo Messenger 0 | On/Logoff ▲ |
| Citibank Online 3 | On/Logoff ▲ |
| Email Corporate 52 | On/Logoff ▲ |
| Wiki Corporate 0 | On/Logoff ▲ |
| My iTunes 0 | On/Logoff ▲ |
| My Recent Documents | ▲ |
| All Programs | ▲ |
| Finder | ▲ |
| MANAGER Preferences/Settings | ▲ |
| MANAGER | LOG-OFF ▲ |

| Status Updates | Alerts | Photo Upload | My Friends | +Add A Friend | Send A Message |
|---|---|---|---|---|---| facebook : Jnicholas    (11 New)    Time: 12:22pm    Logoff

Sun, Feb 1, 2009

| Friend Request | Anna Weinberg — Friend Request: To be confirmed | 12:22pm |
| Message | Eliza Wheeler — MISS U | 11:58am |
| Tagged Photo | Michael Tate — Tagged Photo | 10:42am |

Sat, Jan 31, 2009

| Event Invite | Andrew McCormick — Invitation | 12:22pm |
| Status Comment | James J. Nicholas — Status Comment | 11:58am |
| Friend Confirm | Miriam Rodriguez — Miriam Rodriguez confirmed you... | 10:42am |

ORACLE: Applications Manager          Time: 12:22pm          Logoff ▶

| Overview | Performance | Critical Activities (52-New) | Diagnostics | Business Flows | Security |

Applications System Status:          Data Retrieved 02/01/2009 12:22:53

| Host  | Platform    | Host Status | Database | Concurrent | Forms | Web |
|-------|-------------|-------------|----------|------------|-------|-----|
| APGRT | LINUX Intel | ACTIVE      | ON       | ON         | Yes   | ON  |

Configuration Changes (last 24 hours):          System Alerts:
Date Retrieved 02/01/2009 12:22:53               Date Retrieved 02/01/2009 12:22:53

CHANGES:   Patches Applied              7        ALERTS:      New Alerts         7
           Site Level Profile Options  10                     New Occurrences   10
           Application Files Edited     2                     Open Alerts        0

Web Components Status:                           User Initiated Alerts:
Date Retrieved 2/1/2009 12:22:53                 Date Retrieved 2/1/2009 12:22:53

STATUS:    PL/SQL Agent          UP             ALERTS:      New Alerts         2
           Servlet Agent         UP                          New Occurrences    3
           JSP Agent             UP                          Open Alerts        0
           Discoverer Agent      UP                          Open Occurrences   0
           TCF                   UP

FIG.13

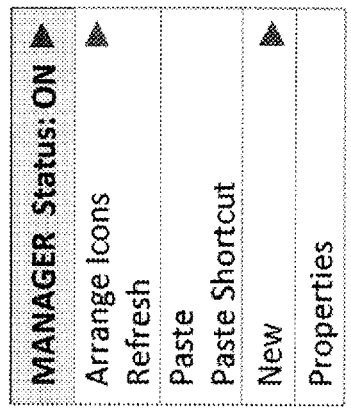
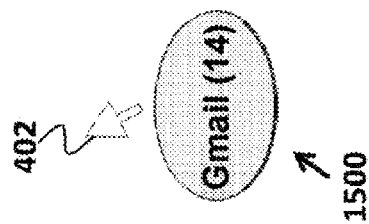
FIG.15
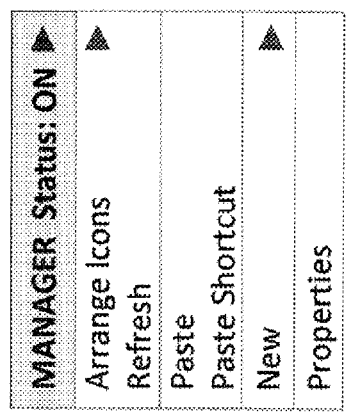
FIG.14

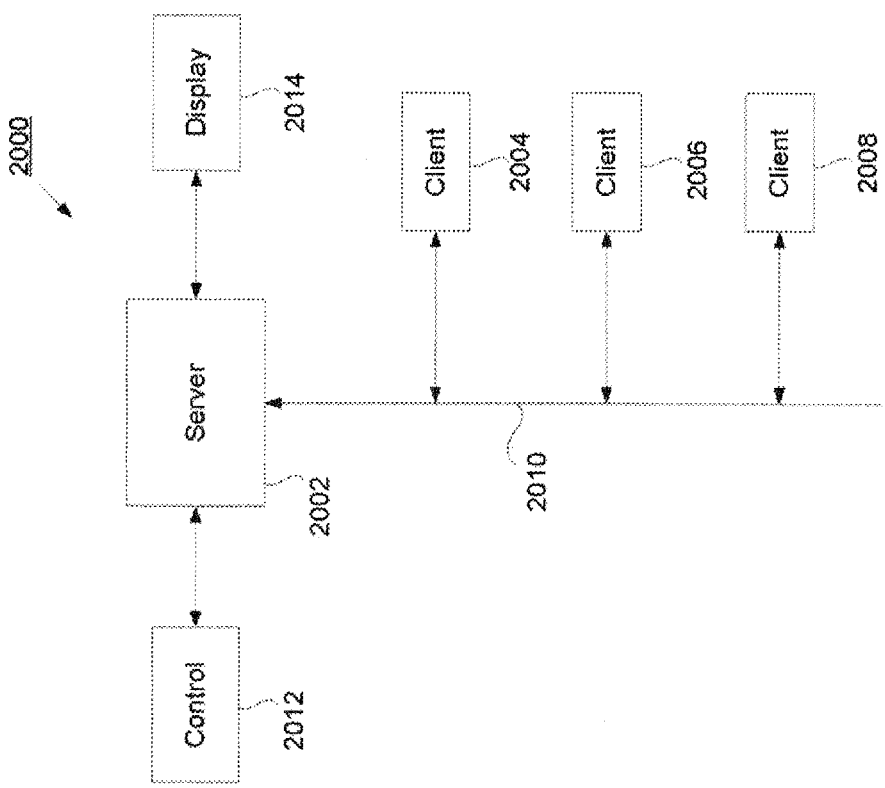

SYSTEM AND METHOD FOR CURSOR-BASED APPLICATION MANAGEMENT

CROSS REFERENCE TO RELATED APPLICATIONS

This Application is a Continuation of U.S. patent application Ser. No. 14/944,785, entitled "SYSTEM AND METHOD FOR CURSOR-BASED APPLICATION MANAGEMENT," filed on Nov. 18, 2015, which is a Continuation of U.S. patent application Ser. No. 14/688,659, now U.S. Pat. No. 9,235,329, entitled "SYSTEM AND METHOD FOR CURSOR-BASED APPLICATION MANAGEMENT," filed on Apr. 16, 2015, which is a Continuation of Ser. No. 14/262,499, now U.S. Pat. No. 9,077,705, entitled SYSTEM AND METHOD FOR CURSOR-BASED APPLICATION MANAGEMENT," filed on Apr. 25, 2014, which is a Division of U.S. patent application Ser. No. 13/797,827, now U.S. Pat. No. 8,850,357, entitled SYSTEM AND METHOD FOR CURSOR-BASED APPLICATION MANAGEMENT," filed on Mar. 12, 2013, which is a Continuation of U.S. patent application Ser. No. 12/551,716, filed Sep. 1, 2009, now U.S. Pat. No. 8,418,079, entitled "SYSTEM AND METHOD FOR CURSOR-BASED APPLICATION MANAGEMENT," each of which are incorporated herein in their entirety.

FIELD OF THE INVENTION

The present invention generally relates to the display of information in a Graphical User Interface ("GUI"), and more particularly to a system and method for managing applications and event notifications using a cursor-based GUI.

BACKGROUND

A GUI is a type of interface that allows users to interact with computers and other electronic devices using visual indicators as opposed to typing in text commands. A typical GUI generally involves the use of a cursor controlled by an interface control (e.g., a mouse or touchpad) where the cursor is used to select a graphical or text based icon to execute a command. The icons are typically organized in a menu that appears on a display screen of the electronic device.

One example of a commonly used GUI is a right-click menu. A right-click menu is a cursor-based drop down menu that appears on the display screen of a computer when the right mouse button is pressed. Right-click menus are traditionally contextual in nature. Thus, the content of the right-click menus typically change depending on the cursor's location on the display screen or the application that is currently running on the computer.

For example, FIGS. 1A-1G illustrate examples of conventional right-click menus. FIGS. 1A-1B illustrate examples of the right-click menus that appears when opened in a Windows OS desktop and a Mac OS desktop respectively. FIGS. 1C-1E illustrate the typical right-click menus that appear when invoked within Microsoft Word, Microsoft PowerPoint and Microsoft Excel respectively. FIGS. 1F-1G illustrate the typical right-click menus that appear when invoked within a FireFox Browser and a Microsoft Internet Explorer Browser respectively. As is evident from these examples, the right click menu's content changes depending on the particular application being used.

While context specific right-click menus provide users with quick access to simple commands related to the specific application being used, they are not well suited for managing the computing environment as a whole. For this reason, despite the ease with which they can be accessed, right-click menus tend to be used sparingly by users.

Further, end-users need a single, unified, persistent user interface to reduce the number of steps required to be productive and manage their computing environment. Users often are required to manage multiple applications and event notifications during any computing session. The steps and actions required by users to manage the present environment are arduous, problematic, and without centralization and convenience. For example, to launch an email application, a user must either select the application from the Start Menu, desktop icon, and/or tool tray, or open a browser and navigate to a log-in page to authenticate a web-based service to begin a session. Additionally, end-users have to manage several applications concurrently, as well as multiple dialogue boxes and notification types native to each application, during that session. This creates frustration and reduces productivity.

SUMMARY OF THE INVENTION

Embodiments of the present invention provide systems and methods for management of applications and event notifications in a cursor-based GUI. In one embodiment of the present invention, applications and notifications are centrally managed using a cursor-based menu. In this embodiment, the menu, which is located adjacent to a cursor, provides end-users with the ability to manage a multiplicity of unrelated applications and event notifications through the use of a single, unified and persistent interface that is non-intrusive and convenient to use.

In another embodiment of the invention, the cursor-based menu is a right-click menu. The right-click menu can contain a plurality of conventional contextual right-click command menu items as well as a persistent application manager item to access an application menu including one or more persistent applications.

In another embodiment of the present invention, the cursor-based menu includes application log-in, access and authentication features.

In yet another embodiment of the invention, the cursor-based menu can be fully customized and configured by an end-user.

In yet another embodiment of the invention, event, data and/or message notifications can automatically be provided to the user via the cursor and/or cursor environment.

In yet another embodiment of the invention, the cursor-based menu is associated with applications that are dynamically updated, wherein the dynamic updates occur in the background of any electronic device.

In yet another embodiment of the invention, various aspects of the applications associated with the cursor-based GUI may be previewed by the user prior to launching any application.

In yet another embodiment of the invention, a centralized application management system manages and/or monitors a plurality of applications outside of the host computer (e.g., on a server), thereby providing a constant online presence with respect to those applications. Access to the centralized applications management system can be cursor-based (e.g., through a right click menu).

Embodiments of the present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

One advantage of an embodiment of the present invention is that a user can reduce the number of steps required to manage their computer environment. This is accomplished by using the cursor based menu to be the centralized manager for applications, application event notifications, application log-in/access/authentication, and finding capabilities. The end result is an environment where a multiplicity of applications can be "brought to the cursor" regardless of context or environment (i.e., in a browser, in an application, on a desktop, etc.) for greater convenience and visibility.

Another advantage of an embodiment of the present invention is that it provides users with the ability to click one button on a mouse to preview notifications from different applications (e.g., email messages, messages from Facebook, instant messages, etc.) in a non-intrusive manner.

Further details and advantages of embodiments of the present invention are set forth below.

BRIEF DESCRIPTION OF THE DRAWINGS

The accompanying drawings, which are incorporated into and constitute a part of this specification, illustrate one or more embodiments and, together with the detailed description, serve to explain the principles and implementations of the invention. In the drawings:

FIG. 4 illustrates a cursor-based GUI in accordance with an embodiment of the present invention;

FIG. 5 illustrates a cursor-based GUI including an application menu in accordance with an embodiment of the present invention;

FIG. 6 illustrates a cursor-based GUI including a manager login menu in accordance with an embodiment of the present invention;

FIG. 7 illustrates a cursor-based GUI including a manager login menu wherein the user is prompted to input a password in accordance with an embodiment of the present invention;

FIG. 10 illustrates a cursor-based GUI including an application menu wherein all applications have been logged into in accordance with an embodiment of the present invention;

FIG. 12 illustrates a cursor-based GUI including an application menu having an exemplary application preview menu in accordance with an embodiment of the present invention;

FIG. 13 illustrates a cursor-based GUI including an application menu having an exemplary application preview menu in accordance with an embodiment of the present invention;

FIG. 14 illustrates a cursor-based GUI including a cursor notification system wherein the cursor changes colors or "glows" in accordance with an embodiment of the present invention;

FIG. 15 illustrates a cursor-based GUI including a cursor notification system wherein the cursor includes a trailing notification message in accordance with an embodiment of the present invention;

FIG. 20 is a block diagram of a typical client-server environment.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. Furthermore, it can also be apparent to those skilled in the art that such components, regardless of how they are combined or divided, can execute on the same computing device or can be distributed among different computing devices connected by one or more networks or other suitable communication mediums.

Figure 1A:
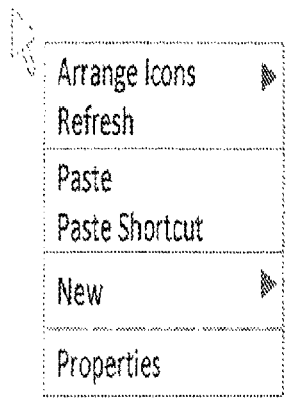
FIGS. 1A-1G illustrate conventional right-click menus by environment.
Figure 1B:
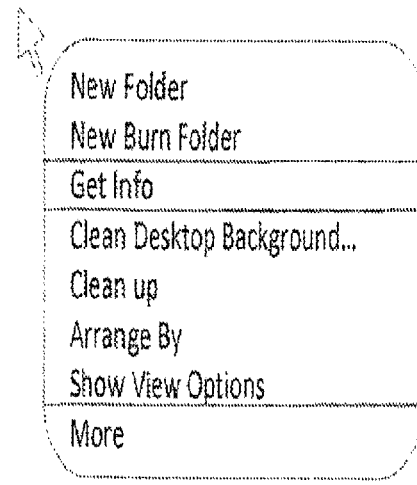
Figure 1C:
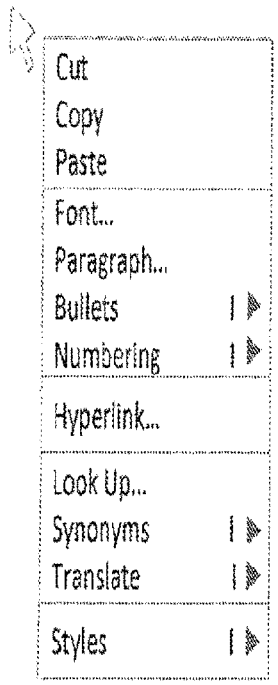
Figure 1D:
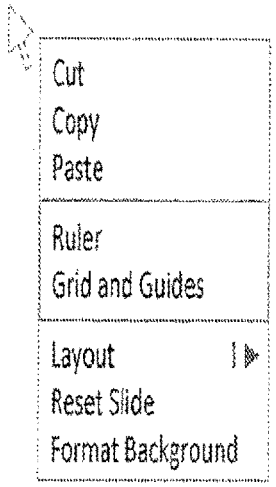
Figure 1E:
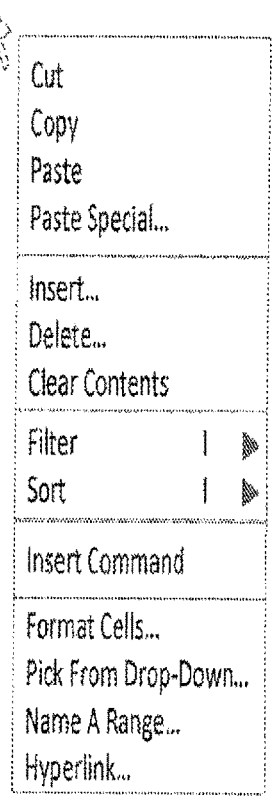
Figure 1F:
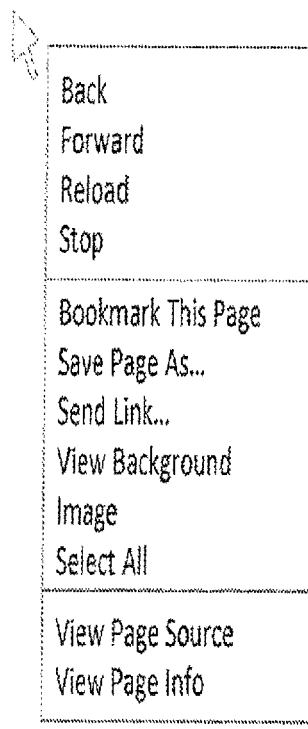
Figure 1G:
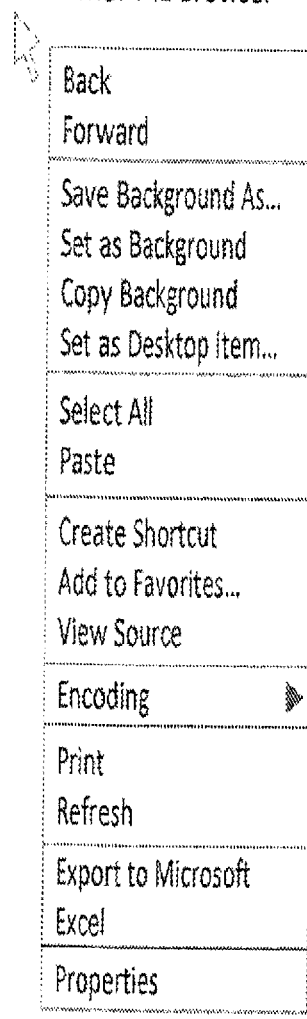
Figure 2:
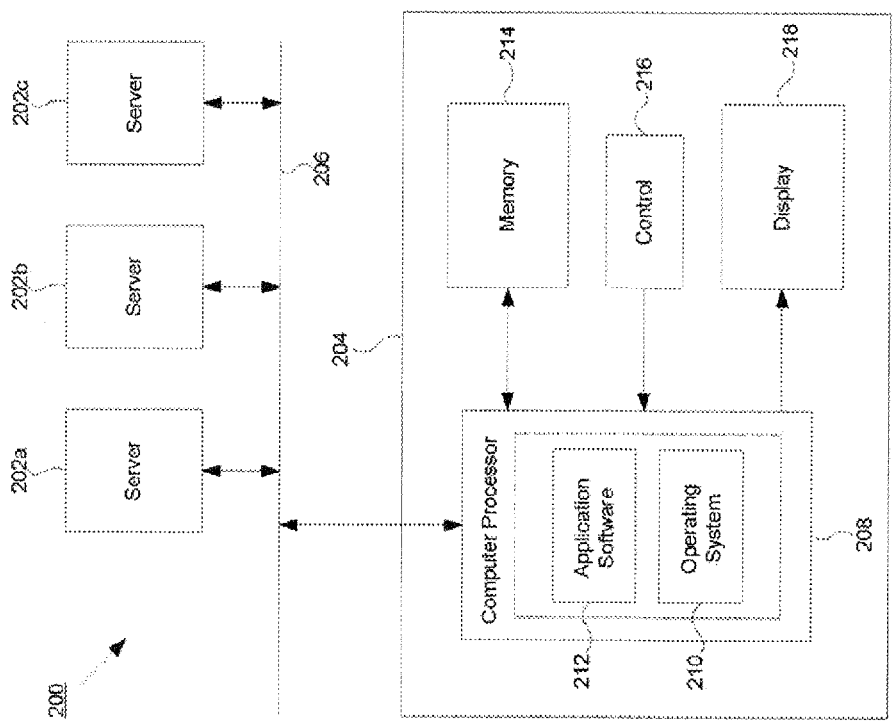
FIG. 2 illustrates a block diagram of a client-server network typical of World Wide Web client-server network.

Referring now to FIG. 2, it illustrates a client-server architecture 200 with multiple servers 202a, 202b, 202c and a client 204 coupled over a network 206. As will be appreciated by those skilled in the art, the system shown in FIG. 2 can represent the World Wide Web client-architecture where the network 206 is the Internet. The client system 204 can include processor and interface hardware 208, an operating system 210 with application software 212 (e.g., GUI), application programs such as a web browser, (e.g., a Microsoft Internet Explorer browser), a memory 214, and an interface control 216 (e.g., a mouse), and a display 218. Client 204 is described further with respect to FIG. 15 below.

Figure 3:
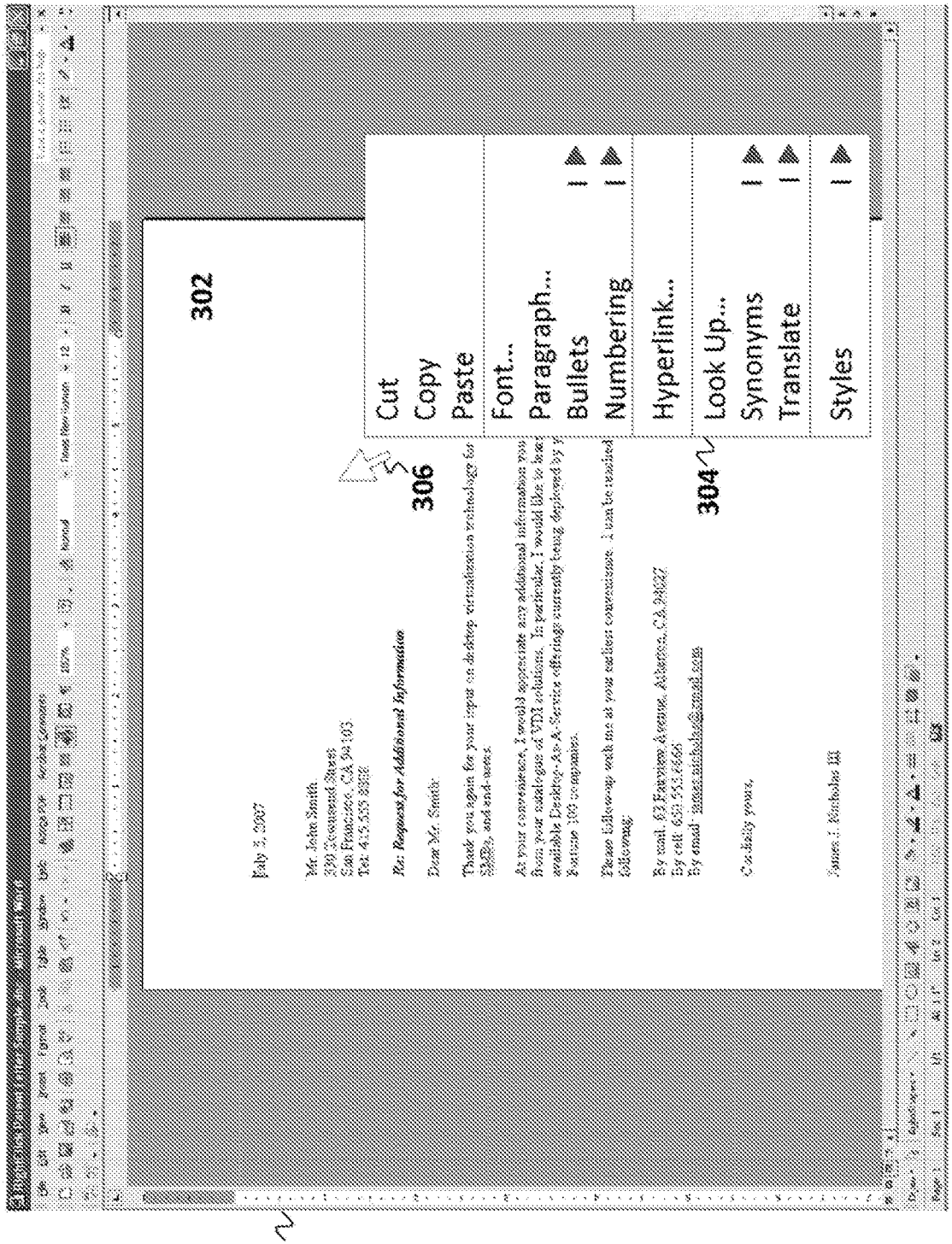
FIG. 3 illustrates a pictorial representation of a display screen illustrating a Microsoft Word right-click menu.

Referring now to FIG. 3, it is a pictorial representation of a display screen 300 illustrating an example of a cursor-based GUI found in the prior art. Specifically, FIG. 3 illustrates an exemplary situation where a user is working on a Microsoft Word document 302. While working on document 302, the user has selected the right-click button on the user's mouse, thereby invoking Microsoft Word right-click menu 304 which is rendered adjacent to cursor 306. Word fight-click menu 304 can be seen as including a set of commands that are specific to Microsoft Word such as cut, copy, paste, etc. While these commands are useful for editing Microsoft Word documents, because they are contextual, they are not well suited for managing the computing environment as a whole. For example, a user cannot manage other applications (e.g., iTunes, Internet Explorer, etc.) through the use of right-click menu 304 since the commands are Microsoft Word specific. Since other conventional right-click menus are similarly contextual in nature, they too are limited in their functionality, thereby minimizing the usefulness of the right-click menu.

FIG. 4 illustrates an exemplary cursor-based GUI in accordance with an embodiment of the present invention. As shown in FIG. 4, cursor-based GUI 400 is located adjacent to cursor 402 and includes a plurality of conventional command menu items 404 found in the prior art as well as application manager item 406, which relates to the current invention. In one embodiment, cursor-based GUI 400 is invoked based on user input. In the preferred embodiment, cursor-based GUI 400 is a right-click menu that can be invoked on a computer display when a user presses the right hand button on a conventional mouse. In other embodiments, the cursor-based GUI 400 may be invoked by using other methods, such as via a touch screen or through voice activation.

In the preferred embodiment, a user can employ a traditional point-and-click style of interaction with cursor-based GUI 400 to select application manager item 406. In this embodiment, application manager item 406 is identified by the term "MANAGER." Selection of application manager item 406 will provide the user with access to application menu 500, which is illustrated in FIG. 5.

As generally shown in FIG. 5, application menu 500 allows users to manage and monitor a plurality of unrelated applications, commands and event notifications via a centralized cursor-based interface that is efficient and convenient to use. Application menu 500 can generally include a plurality of application shortcuts, links to interact websites, and other system-based items such as file folders, commands and tools. In an alternative embodiment, these items can be included within GUI 400 without the use of a separate application menu, thereby allowing the user to access those items without first selecting an application manager item.

Still referring to FIG. 5, this embodiment of application menu 500 can be seen as including a plurality of links to popular websites (e.g., Gmail, Facebook, Skype, Twitter, Yahoo Messenger, Citibank Online), application shortcuts (e.g., My iTunes, Finder) and other system-based items (e.g., "My Recent Documents" and "All Programs," which are normally found in the Windows Start Menu). Application menu 500 also includes commands specific to the application manager tool of the present invention (e.g., "MANAGER Preferences/Settings" and "MANAGER LOG-OFF"). In this embodiment, the user can launch any of these applications directly from application menu 500 by selecting (e.g., left-clicking on) the desired application. These examples are not intended to be limiting and other items can also be included in application menu 500 as would be envisioned by one having ordinary skill in the art.

One significant aspect of application manager item 406 is that it can be persistent, as opposed to being contextual, in nature. In other words, application manager item 406 can appear within any cursor-based GUI (e.g., a conventional right-click menu) regardless of the end-user's computer environment. The items included in application menu 500 can also be persistent, so those items will similarly remain constant regardless of the end-user's computer environment. By providing users with persistent access to the items associated with application manager item 406, the end result is that the cursor environment can become the focal point for managing, invoking and monitoring computer applications. Put another way, computer applications are brought to the cursor environment, thereby taking full advantage of this often seen but underutilized piece of "real estate" on the computer display.

Figure 8:
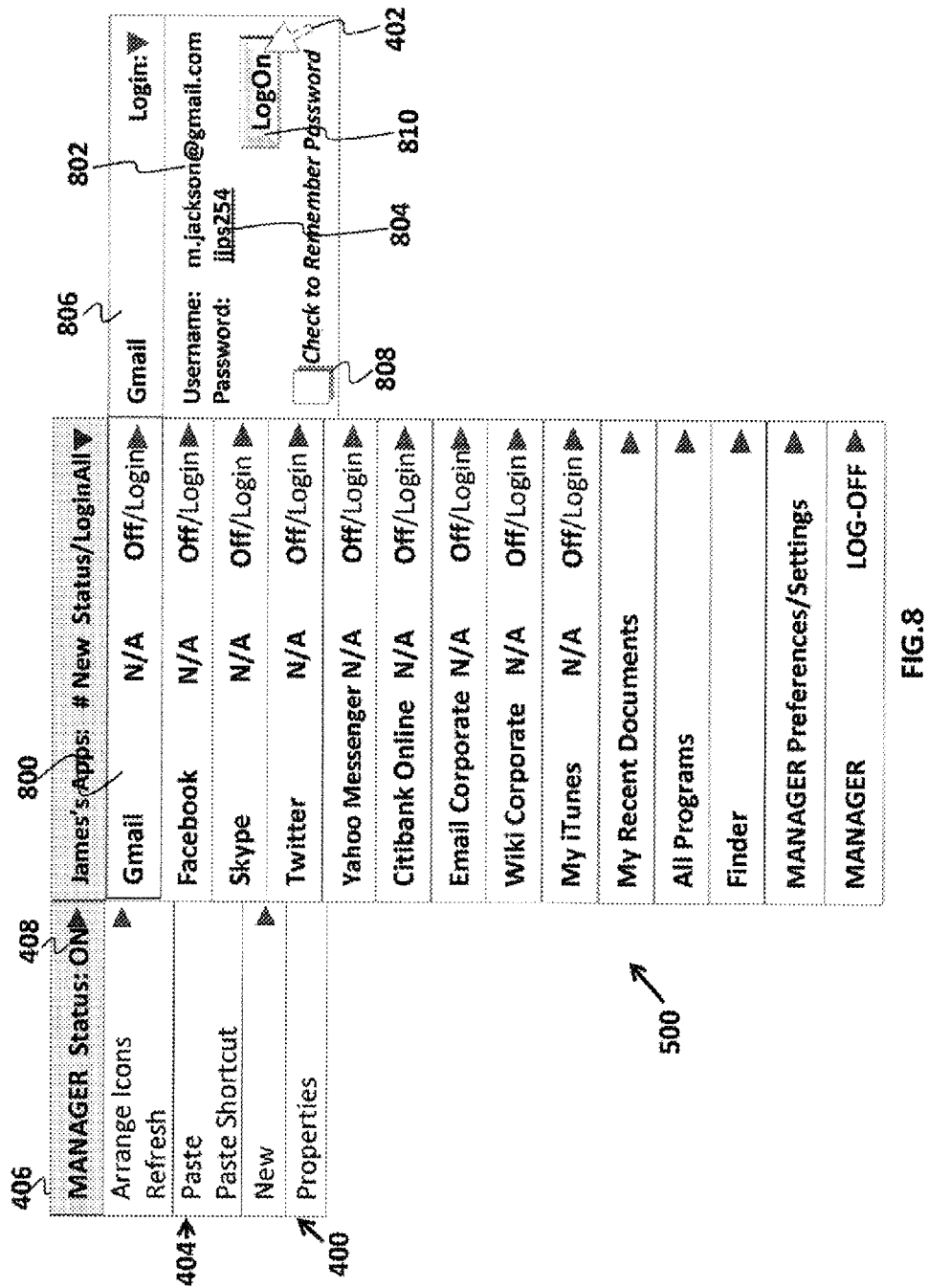
FIG. 8 illustrates a cursor-based GUI including an application login menu in accordance with an embodiment of the present invention.

In some instances the user may want to limit access to the items associated with application manager item 406 within cursor-based GUI 400. Accordingly, certain embodiments of the current invention, user authentication may be required before the items associated with application manager item 406 (i.e., the items included in application menu 500) can be accessed. FIGS. 6-8 illustrate exemplary embodiments of cursor-based GUI 400 including authentication features.

Referring now to FIG. 6, it illustrates cursor-based GUI 400 wherein a user has selected the application manager item 406, which thereby invokes manager log-in menu 600. In this embodiment, manager log-in menu 600 includes "Login" button 602. Upon selection of "Login" button 602, the user is prompted to input a password in password box 700 as shown in FIG. 7. The user is also given the option of checking box 702 to remember the password. Once the correct password is input, the "MANAGER Status" indicator 408 will change from "OFF" to "ON" and the user will be able to access application menu 500 (as shown in FIG. 5). In an embodiment of the invention, user authentication may not be required. Thus, "MANAGER Status" indicator 408 will be "ON" by default upon computer startup. In an embodiment, once application manager item 406 has been enabled a visual indicator will be provided to the user that indicates that application manager item 406 has been enabled. For example, as shown in FIGS. 4 and 5, application manager item 406 changes colors or "glows" to indicate that it is on.

Referring back to FIG. 5, once the user has been provided with access to application menu 500, several applications contained therein may require further individualized authentication. In this example, among other things, the user's Gmail and Facebook accounts will each require individualized authentication to access those separate accounts.

Referring now to FIG. 8, it illustrates an example where a user can log into an application directly from application menu 500. Specifically, the user is logging into the users Gmail account. In this example, upon selection of the Gmail application item 800, the user is prompted to input username 802 and password 804 information in Gmail log-in menu 806. The user is also given the option of checking box 808 to remember the password. Once the username 802 and password 804 have been input, the user can select "Logon" button 810 to access the user's Gmail account.

Figure 9:
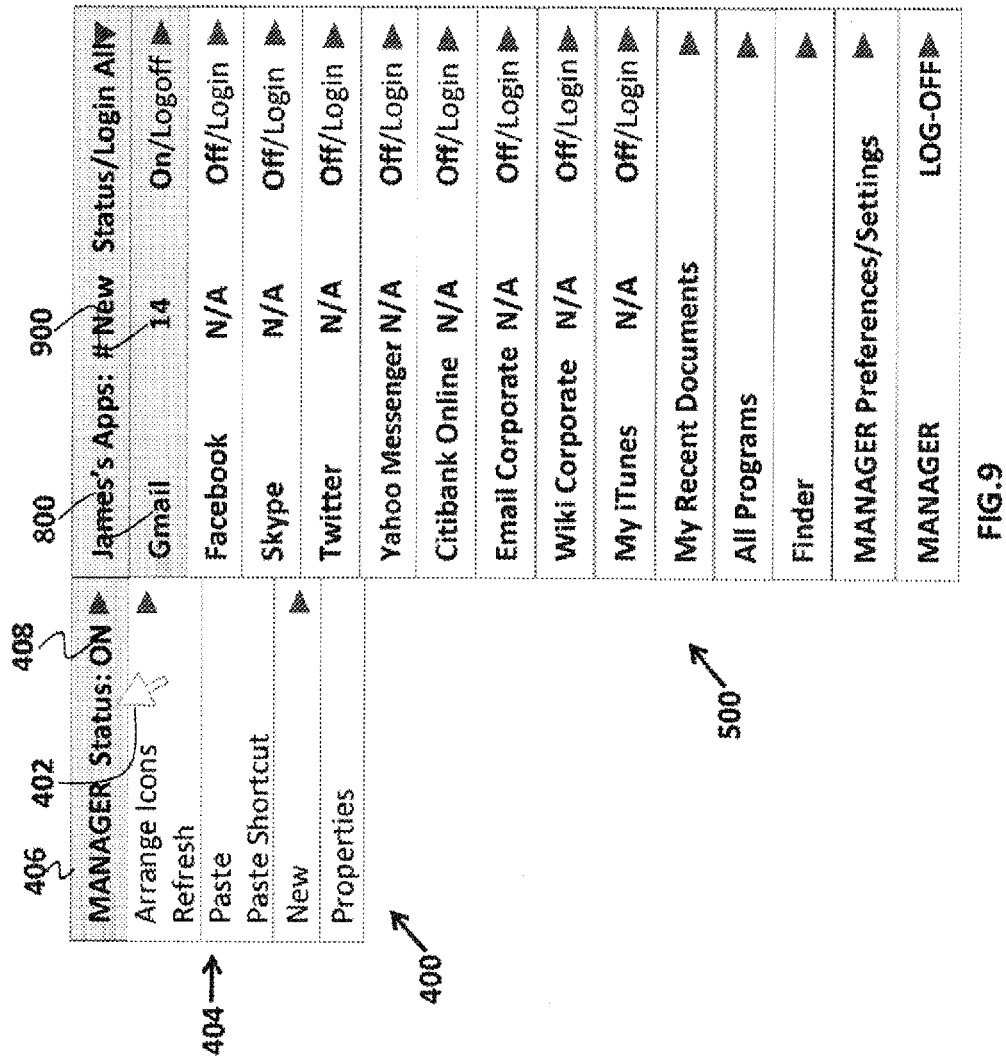
FIG. 9 illustrates a cursor-based GUI including an application menu wherein a single application has been logged into in accordance with an embodiment of the present invention.

FIG. 9 illustrates application menu 500 wherein the Gmail account has been successfully activated. In this embodiment, Gmail application item 800 includes new message indicator 900, which communicates to the user how many new messages are associated with the Gmail account. In this example, the user has 14 new messages. Other embodiments of the invention may include other indicators related to the Gmail account. For example, Gmail application item 800 may include sender information and/or subject information related to each new message. Other relevant information related to the Gmail account can also be rendered in application menu 500. It is to be understood that other applications included in application menu 500 can also be individually accessed in a similar manner as described for the Gmail account.

It is also envisioned that the user may wish to log into all of the applications identified in application menu 500 simultaneously. In this situation, the user can simply select the "Login All" item 502 as shown in FIG. 5. Assuming that authentication information has been saved for the applications identified in application menu 500, the user will be logged into all relevant applications as shown in FIG. 10. In an embodiment, once the user has successfully logged into a particular application, its associated application menu item will change colors or "glow" to indicate that it is on (as shown in FIGS. 9 and 10).

In the preferred embodiment of the invention, applications that have been logged into will be dynamically updated within application menu 500. This is particularly desirable for Internet-based applications, such as email accounts (e.g., Gmail), social utilities websites (e.g., Facebook, Twitter), etc. Application alerts, notifications and reminders can also be dynamically handled within application menu 500. Consequently, the user will be able to monitor a plurality of applications including up-to-the-minute information from a centralized location on the display screen (i.e., the cursor environment).

In another embodiment of the present invention, the user can access a preview menu associated with an application found in application menu 500. The preview menu allows a user to preview information from selected applications without invoking the entire application. Thus, the preview menu acts as a navigation management GUI that aids the user through convenient, configurable, high speed access to information contained in those applications. In a user environment where the application runs locally, the entire application would not need to be completely started or shut down in order to view the preview. In a server environment, the entire application would not need to run all the way downstream to the user, but rather only relevant user specific data would be transported to the user and rendered within the preview menu.

Figure 11:
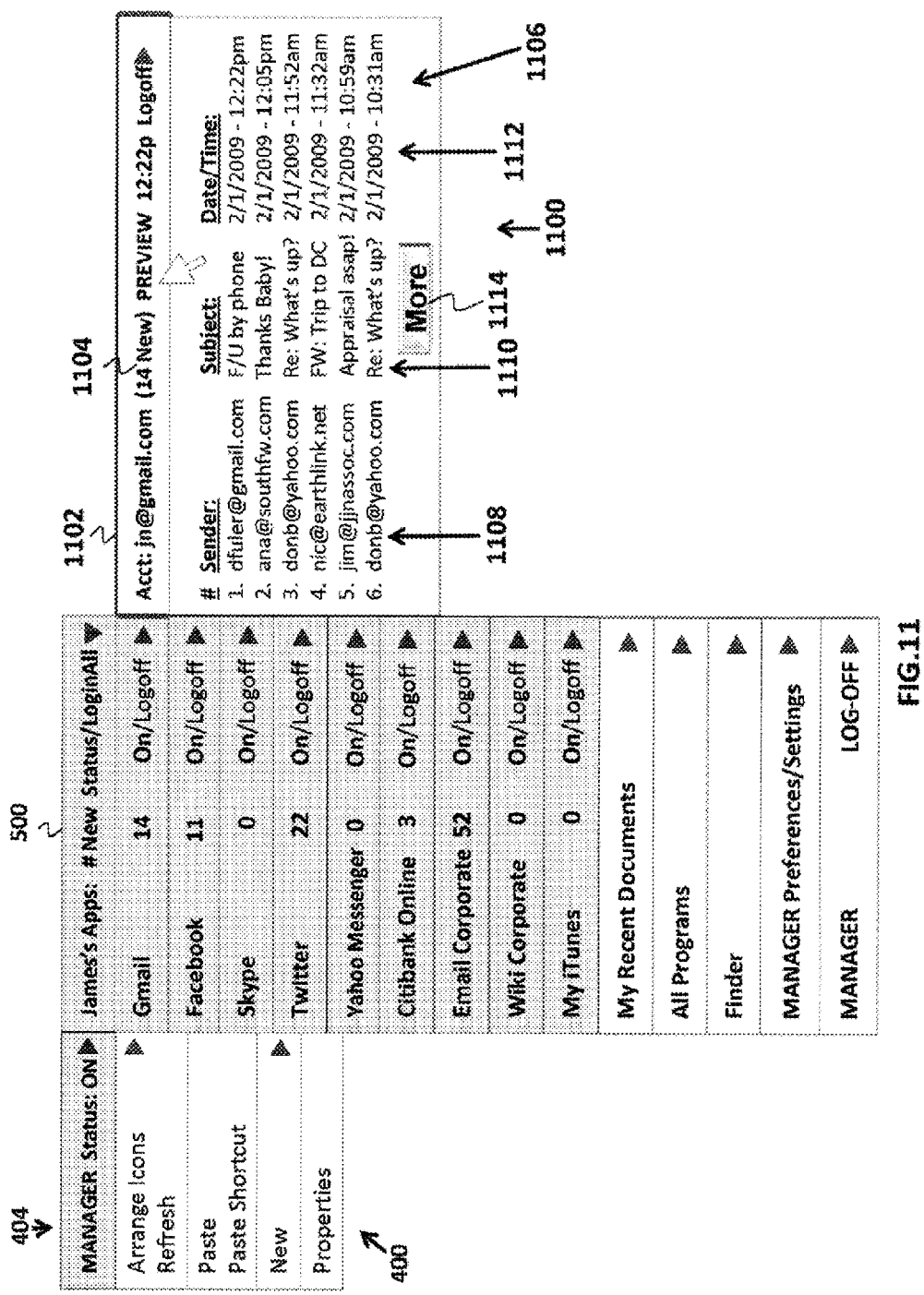
FIG. 11 illustrates a cursor-based GUI including an application menu having an exemplary application preview menu in accordance with an embodiment of the present invention.

For example, FIG. 11 illustrates a situation where selection of Gmail application item 800 invokes application preview menu 1100. Preview menu 1100 can be seen as including the user's email address 1102, a new message indicator 1104, and a plurality of email messages 1106 including sender information 1108, subject information 1110, and time and date information 1112. In this embodiment, the user can preview additional email messages by selecting the "More" button 1114. In an embodiment, clicking on any of the messages will access the triggering application. In other words, for this example, clicking on any of the messages can invoke the user's Gmail account running in a web browser in a separate window. In another embodiment, user selection of a specific message will prompt another display including the contents of the selected message. In yet another embodiment, the user will be able to delete individualized messages directly from preview menu 1100.

In another example, FIG. 12 illustrates a situation where the user has invoked Facebook preview menu 1200. In this example, Facebook preview menu 1200 allows a user to preview various messages and status updates associated with the user's personal Facebook account. Specifically, Facebook preview menu 1200 can be seen as including new message indicator icon 1202, friend request icon 1204, message icon 1206, tagged photo icon 1208, event invite icon 1210, status comment icon 1212, and friend confirm icon 1214. The preview also identifies the dates and times associated with the various messages and status updates. In an embodiment, the user can select icons 1202 through 1214 to view the entire message, photo and/or update. In this embodiment, Facebook preview menu 1200 also includes fitter icons 1216. Filter icons 12 16 can be selected to preview certain types of messages and/or status updates. They can also be selected to invoke other operations available through Facebook. For example, send a message icon 1218 can be selected to invoke another interface whereby a user can send another Facebook member a private message.

In yet another example, FIG. 13 illustrates a situation where the user has invoked Oracle Applications Manager preview menu 1300. As can be seen in this example, the preview menu can be configured to provide status updates 1302 and alerts 1304 associated with a user's corporate work account. As with the other examples, other useful graphical icons can be provided in the preview that are associated with the user's corporate work account. In this example, overview icon 1306, performance icon 1308, critical activities icon 1310, diagnostics icon 1312, business flows icon 13 14 and security icon 13 16 are included. It is noted that all of these examples of preview displays are not intended to be limited to these specific examples and may incorporate other methods as would be envisioned by one having ordinary skill in the art.

In another embodiment of the invention, the cursor 402 on the computer driven display can be used to notify the user that the application manager item 406 has been enabled (i.e., is "ON"). In an embodiment, the cursor 402 can change colors or "glow" when the application manager item 406 has been enabled. In another embodiment, the cursor environment 1400 can change colors when the application manager item 406 has been enabled (as shown in FIG. 14). In yet another embodiment, the cursor 402 may change in size or shape to provide the notification. Specific examples of shapes may include any geometric polygons, shapes of corporate logos, product logos, and trademarks. These images can be stored as cursor files (such as, e.g., ".cur" or ".ani" file types).

In another embodiment, the cursor alert notifications may be delivered by events, reminders and other notifications related to the applications included in application menu 500.

For example, the cursor 402 and/or cursor environment 1200 may change colors or "glow" whenever an application included within application menu 500 has been updated (e.g., when an email application receives a new message). In another example, the cursor icon may change in size or shape to provide alert notifications.

In yet another example, a trailing notification message 1300 related to an application included in application menu 500 may be displayed in relation to or adjacent to the cursor 402 as shown in FIG. 15. The trailing notification message 1500 can be triggered by and reflect any events, reminders and other notifications related to any applications as desired and configured by the user. In the example illustrated in FIG. 13, trailing notification message 1500 notifies the user that he or she has 14 new Gmail messages to review. In an embodiment, notification message 1500 will move as icon 402 moves, staying in relation to adjacent to icon 402 so that the message stays with the user's focus of attention. In yet another embodiment, a plurality of notification messages can appear on the screen adjacent to icon 402.

In an embodiment, the alert notifications described above will disappear after a preset amount of time. Thus, the user can ignore the alert notification and simply continue working without interruption. In another embodiment, the alert notifications will remain on the screen until the triggering application is accessed. While the notifications remain on the screen, the user can still ignore them and continue working without further interruption.

In an embodiment, trailing notification message 1500 notifies the user of events or other data without the use of a dialog box, or other such mechanisms, that utilize computing resources which interfere with the continuous operation of running applications or other network-based services. This enables the user to continuously utilize an application or service while concurrently receiving new information or data. In this way, the present invention enables users to continue working until they choose to respond to such messages or data.

In the preferred embodiment of the invention, all aspects of cursor-based GUI 400 and application menu 500 can be entirely customized and configured by an end-user. Accordingly, in an embodiment of the invention, application menu 500 includes command menu items to allow a user to configure cursor based GUI 400. Referring back to FIG. 5, in this embodiment, these command menu items (not shown) can be accessed by selecting the "MANAGER Preferences/Settings" item 504.

Figure 16:
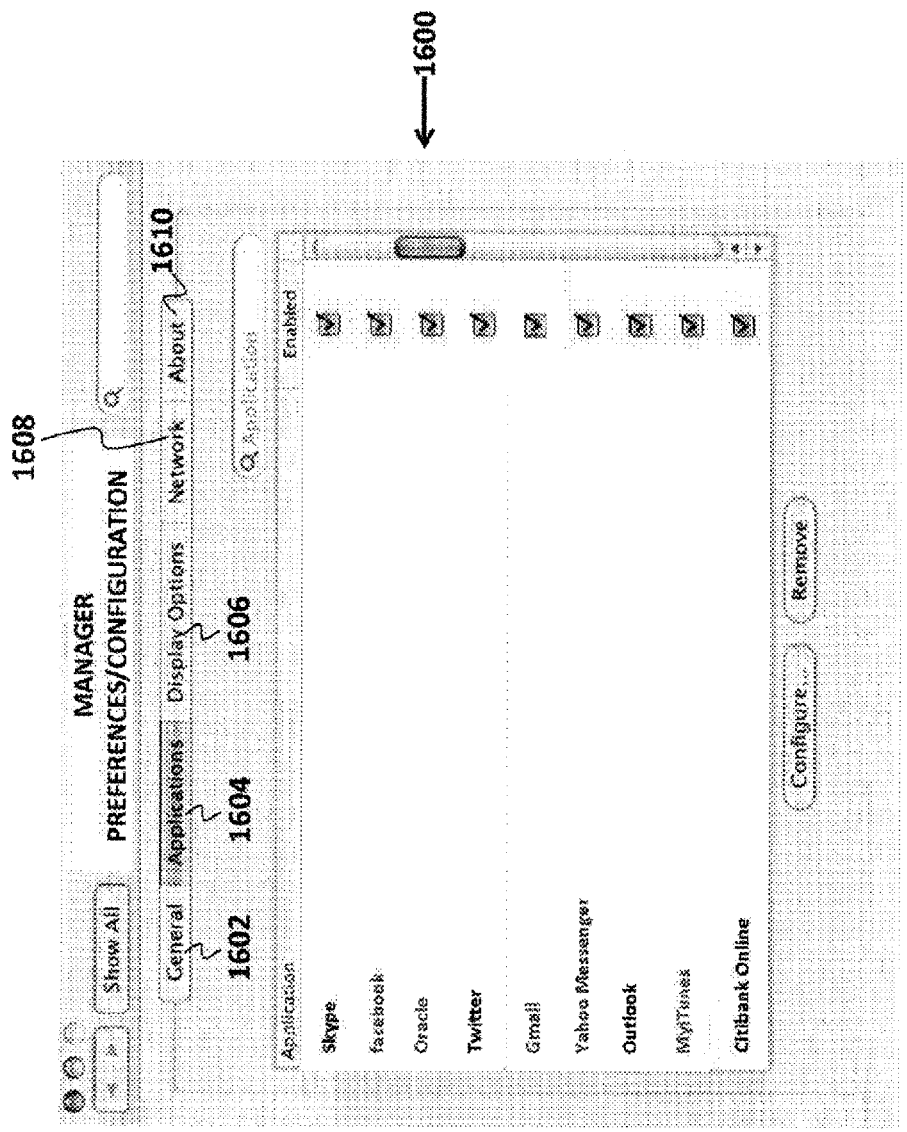
FIG. 16 illustrates an application configuration menu for cursor-based GUI in accordance with an embodiment of the present invention.

The types of adjustments to be made to application menu 500 by the user can include the following. In an embodiment, the user will have the ability to pick the specific applications to include in application menu 500. Thus, application menu 500 may include a single application or a plurality of applications. For example, FIG. 16 illustrates application configuration menu 1600 where the user can select the specific applications that the user desires to be enabled. In this embodiment, the user is provided with general icon 1602, applications icon 1604, display options icon 1606, network icon 1608, and about icon 1610. Icons 1602 through 1610 can be selected to configure various other aspects of the invention through application configuration menu 1600.

In another embodiment, the specific information displayed with respect to each individual application included in application menu 500 can also be configured by the user. Thus, for example, a user may configure the system to display both new message and sender name information with respect to an email account included in application menu 500. In an embodiment, user authentication and access settings can also be configured by the user. In another embodiment, the "look and feel" of the cursor environment—including the cursor-based GUI, the cursor and the application menu—can be configured by the user. A user may wish to configure the "look and feel" of the cursor environment to be, for example, more aesthetically pleasing or more efficient for the particular user. These customizable configurations are not intended to be limited to these specific examples and may incorporate other methods of customizing the system as would be envisioned by one having ordinary skill in the art.

Cursor-based GUI 400 can be displayed on a computer, a television, a handheld device (e.g., a personal digital assistant), a wireless device (e.g., mobile/cellular phone, Wireless Application Protocol enabled mobile phone), or other electronic device driven displays that include a GUI. The cursor 402 of the present invention can include a highlighted area of the screen moved in relation to at least one of a mouse, a remote control device, a directional key, and a selector. The remote control can include, for example, a remote control for a television. Such a remote control device could also use a pointer mechanism to allow the viewer to navigate the TV screen and "double-clicking" selected options to activate or access information (much like a desktop mouse pointer), rather than using a highlighted area to navigate a command menu.

As the development and deployment of the Cable TV Modem or Direct Link to the cable network become more prevalent more resources will be available to the viewing public. The television has become a "standard" in most American homes and has become a true multi-use device. The present invention may be used in conjunction with game consoles with telephone modems, cable modems and direct TV interfaces, as well as TV set-top devices that connect the viewer directly to the Internet or Public Switched Telephone Network (PSTN).

Figure 17:
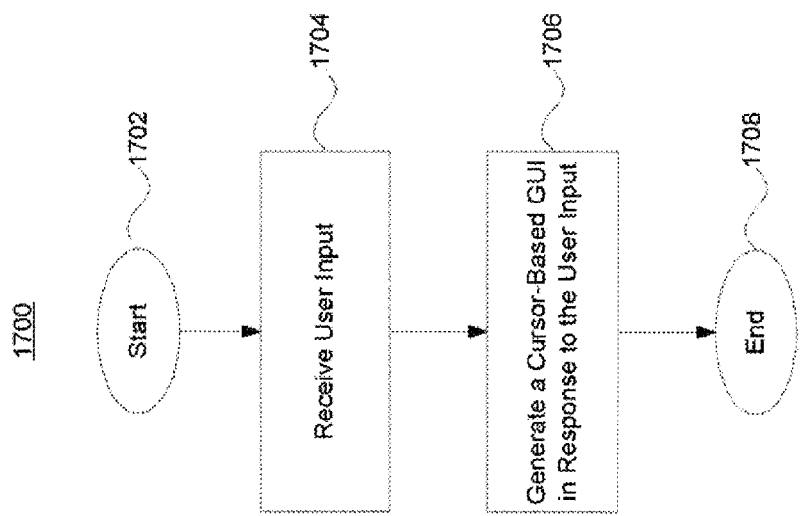
FIG. 17 depicts a flow diagram of computer-implemented steps to manage one or more applications using a cursor-based GUI in accordance with an embodiment of the present invention.

Referring now to FIG. 17, it depicts a flow diagram of computer-implemented program steps to manage one or more applications using a cursor-based GUI in accordance with an embodiment of the present invention. The flow diagram includes an example flow diagram 1700 beginning with a step 1702, which can continue immediately with a step 1704. In step 1704, user input is received. In an embodiment, the user input is received upon user selection of the right hand button on a conventional mouse. In step 1706, a cursor-based graphical user interface is generated in response to the user input. The cursor-based graphical user interface includes (i.e., is associated with) one or more persistent application items that remain constant within the cursor-based graphical user interface regardless of the user's computer environment. From step 1706, flow diagram 1700 can end with step 1708

Figure 18:
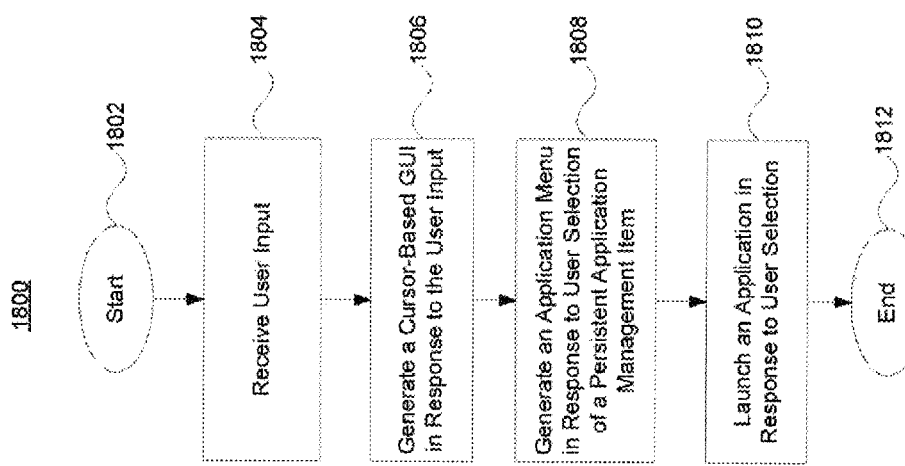
FIG. 18 depicts a flow diagram of computer-implemented steps to manage one or more applications using a cursor-based GUI in accordance with an embodiment of the present invention.

Referring now to FIG. 18, it depicts an expanded flow diagram of computer-implemented steps to manage one or more applications using a cursor-based GUI in accordance with an embodiment of the present invention. The flow diagram includes an example flow diagram 1800 beginning with a step 1802, which can continue immediately with a step 1804. In step 1804, user input is received. In step 1806, a cursor-based graphical user interface is generated in response to the user input. The cursor-based graphical user interface includes a persistent application management item. The persistent application management item is always included within the cursor-based graphical user interface. In step 1808, an application menu is generated in response to user selection of the persistent application management item. The application menu includes one or more persistent application items. In an embodiment, at least one of the one or more persistent application items remains constant within the application menu regardless of the user's computer environment. In another embodiment, all of the persistent application items remain constant within the application menu regardless of the user's computer environment. In step 1810, an application is launched in response to user selection of a persistent application item. From step 1810, flow diagram 1800 can end with step 1812.

It is to be understood that the computer-implemented program steps to manage one or more applications using a cursor-based GUI can include any additional steps as would be apparent from the disclosures contained herein. For example, method steps to satisfy user authentication requirements may be implemented. As another example, the cursor-based GUI can display various previews with respect to the application items. In yet another example, all applications associated with the cursor-based GUI may be dynamically updated, wherein the dynamic updates occur in the background of any electronic device. These and other method steps will be apparent to those skilled in the art based on the disclosures contained herein.

The products, systems and methods of the present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

Figure 19:
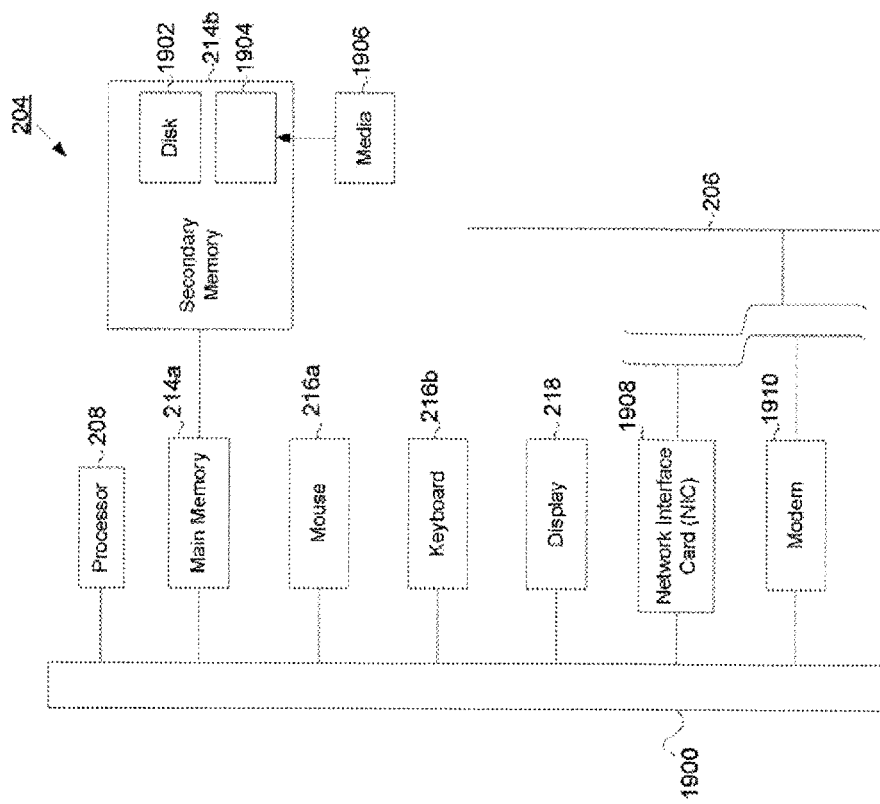
FIG. 19 illustrates an example embodiment of the client computer of the present invention.

Referring now to FIG. 19, it depicts an exemplar client computer 204 computer system which can alternatively be another type of electronic device. Other components of the invention, such as server computers 202*a*-202*c,* could also be implemented using a computer such as that shown in FIG. 19. The computer system 204 can include one or more processors, such as processor 208. The processor 208 is connected to a communication bus 1900. Client computer 204 can also include a main memory 214*a,* preferably random access memory (RAM), and a secondary memory 214*b.* The secondary memory 214*b* includes, for example, a hard disk drive 1902 and/or a removable storage drive 1904, representing a floppy diskette drive, a magnetic tape drive, a compact disk drive, etc. The removable storage drive 1904 can be read from and/or write to a removable storage unit 1906 in a well known manner.

Removable storage unit 1906, also called a program storage device or a computer program product, represents a floppy disk, magnetic tape, compact disk, etc. The removable storage unit 1906 can include a computer usable storage medium having stored therein computer software and/or data, such as an objects methods and data. Client computer 204 also can include an input device such as (but not limited to) a mouse 216*a* or other pointing device such as a digitizer, and a keyboard 216*b* or other data entry device. Also shown are a display 218, a network interface card (NIC) 1908, a modem 1910, and network 206.

Computer programs (also called computer control logic), including object oriented computer programs, are stored in main memory 214*a* and/or the secondary memory 214*b* and/or removable storage units 1906, also called computer program products. Such computer programs, when executed, enable the computer system 204 to perform the features of the present invention as discussed herein. In particular, the computer programs, when executed, enable the processor 208 to perform the features of the present invention. Accordingly, such computer programs represent controllers of the computer system 204.

In another embodiment, the invention is directed to a computer program product comprising a computer readable medium having control logic (computer software) stored therein. Put another way, the invention is directed to a computer-readable storage device encoded with a computer program, the computer program comprising instructions. The control logic (or computer program comprising instructions), when executed by the processor 208, causes the processor 208 to perform the functions of the invention as described herein. In yet another embodiment, the invention is implemented primarily in hardware using, for example, one or more state machines. Implementation of these state machines as to perform the functions described herein will be apparent to persons skilled in the relevant arts. In yet another embodiment, the invention is implemented using a combination of hardware and software.

In an embodiment, the applications associated with application manager item 406 can be monitored and/or managed by a centralized application management system operating in a client-server environment can be utilized. A typical client-server environment is depicted in FIG. 20. Client-server environment 2000 includes a server 2002 and multiple clients 2004, 2006, 2008 coupled over a communication link 2010. Server 2002 can be coupled to an interface control 2012 (e.g., a mouse or keyboard) and a display 2014.

A centralized application management system in accordance with the present invention can be used to manage and monitor a plurality of applications in real-time, regardless of whether the user is connected to the computer or not. This provides the user with a constant virtual online presence with respect to all the applications. In an embodiment, the centralized application management system resides on a host computer. In another embodiment, the centralized application management system resides at a location outside of the host computer (e.g., on a server).

In an embodiment, the user can access all the applications being managed by the centralized application management system through one point of entry through a single log on. In the preferred embodiment, the point of entry would be cursor-based (e.g., through the use of a right-click menu). Access would be provided to all registered applications. As an example, all messages from all desired user email accounts could be centrally managed by a web-based application management system. In this example, the user would access all of the user's email accounts simultaneously through the centralized cursor-based system. In an embodiment, the access point would be the right-click menu as disclosed above. It is to be understood that the centralized application management system has the ability to manage a variety of applications and notifications, and is not limited to just email accounts. In an embodiment, a plurality of users would be able to access a shared application being managed by the centralized application management system. In yet another embodiment, a user may access the web-based application management system on any desired computer to download and install the cursor-based GUI including application manager item 406 (which has been configured to include the user's desired applications and features as disclosed above) on any computer.

The centralized application management system would provide the intelligence to manage the communications to be sent to the cursor environment even when the user is off-line. In an embodiment, the present invention can be utilized as an interactive data "receptacle" or utility or notification agent that runs in the background of any electronic device and can be profiled to accept any kind of aggregated data to facilitate the flow of information and data within any electronic computing environment or other networked environment.

Although the present invention has been shown and described in detail with regard to only a few exemplary embodiments of the invention, it should be understood by those skilled in the art that it is not intended to limit the invention to the specific embodiments disclosed. Various modifications, omissions, and additions may be made to the disclosed embodiments without materially departing from the novel teachings and advantages of the invention, particularly in light of the foregoing teachings. Accordingly, it is intended to cover all such modifications, omissions, additions, and equivalents as may be included within the spirit and scope of the invention as defined by the following claims.

What is claimed is:

1. An application management system for managing authentication for one or more applications, comprising:
   one or more processors;
   a touch screen input device coupled to the one or more processors; and
   a computer-readable medium comprising instructions stored therein, which when executed by the processors, cause the processors to perform operations comprising:
      receiving, via the touch screen input device of the application management system, a first authentication requirement, wherein the first authentication requirement is associated with a first application and provides a login credential for a service associated with the first application;
      receiving, via the touch screen input device of the application management system, a second authentication requirement, wherein the second authentication requirement is associated with a second application and provides a login credential for a service associated with the second application and wherein the first authentication requirement is different from the second authentication requirement; and
      associating, by the processors, the first authentication requirement and the second authentication requirement with a single manager login credential, and wherein the single manager login credential is configured to facilitate user access to the first application and the second application.

* * * * *